United States Patent
Prichard et al.

(10) Patent No.: US 7,353,053 B2
(45) Date of Patent: Apr. 1, 2008

(54) NON-BINDING SLIDING DISPLAY FOR A HANDHELD ELECTRONIC DEVICE

(75) Inventors: Michael Prichard, Carlisle, MA (US); Jonathan Betts-Lacroix, San Mateo, CA (US)

(73) Assignee: OQO, Inc., San Francisco, CA (US)

( * ) Notice: Subject to any disclaimer, the term of this patent is extended or adjusted under 35 U.S.C. 154(b) by 553 days.

(21) Appl. No.: 10/997,794

(22) Filed: Nov. 23, 2004

(65) Prior Publication Data

US 2006/0109250 A1 May 25, 2006

(51) Int. Cl.
*H04M 1/00* (2006.01)
(52) U.S. Cl. .............. 455/575.4; 455/90.3; 455/575.1; 455/550.1; 379/433.01; 379/433.11; 379/433.12
(58) Field of Classification Search ........... 379/433.01, 379/433.04, 433.11, 433.12; 455/550.1, 455/556.1, 566.2, 575.1, 575.4, 90.3
See application file for complete search history.

(56) References Cited

U.S. PATENT DOCUMENTS

| | | | |
|---|---|---|---|
| 5,151,946 A * | 9/1992 | Martensson ............. | 455/575.4 |
| 5,193,051 A | 3/1993 | Ma .......................... | 361/393 |
| 5,241,303 A | 8/1993 | Register et al. ............ | 340/706 |
| 5,432,720 A | 7/1995 | Lucente et al. ............ | 364/708 |
| 5,548,478 A | 8/1996 | Kumar et al. .............. | 361/681 |
| 5,708,561 A | 1/1998 | Huilgol et al. ............. | 361/681 |
| 5,831,817 A | 11/1998 | Chang ........................ | 361/681 |
| 6,016,176 A | 1/2000 | Kim et al. .................... | 349/84 |
| 6,078,495 A | 6/2000 | Cipolla et al. .............. | 361/680 |
| 6,522,530 B2 | 2/2003 | Bang .......................... | 361/681 |
| 6,636,419 B2 | 10/2003 | Duarte ........................ | 361/680 |
| 6,665,173 B2 * | 12/2003 | Brandenberg et al. ...... | 361/680 |
| 6,667,738 B2 * | 12/2003 | Murphy ....................... | 345/173 |
| 6,748,249 B1 * | 6/2004 | Eromaki et al. ........... | 455/575.4 |
| 6,993,128 B2 * | 1/2006 | Eromaki ................... | 379/433.12 |
| 7,107,018 B2 * | 9/2006 | Jellicoe ...................... | 455/90.3 |
| 7,136,688 B2 * | 11/2006 | Jung et al. ................ | 455/575.4 |
| 2001/0031644 A1 * | 10/2001 | Eromaki ..................... | 455/550 |
| 2001/0036266 A1 * | 11/2001 | Gronroos et al. ......... | 379/433.01 |
| 2003/0006942 A1 | 1/2003 | Searls et al. ................. | 345/1.1 |
| 2003/0038786 A1 | 2/2003 | Nguyen et al. ............. | 345/169 |
| 2003/0103041 A1 | 6/2003 | Nguyen et al. ............. | 345/168 |
| 2004/0174666 A1 * | 9/2004 | Bradenberg et al. ....... | 361/680 |
| 2004/0198477 A1 * | 10/2004 | Jung et al. ................ | 455/575.4 |
| 2005/0049019 A1 * | 3/2005 | Lee ........................... | 455/575.4 |
| 2005/0079898 A1 * | 4/2005 | Park .......................... | 455/575.1 |
| 2006/0068859 A1 * | 3/2006 | Lee et al. .................. | 455/575.4 |

(Continued)

*Primary Examiner*—Lana Le
*Assistant Examiner*—April S. Guzman
(74) *Attorney, Agent, or Firm*—Mattingly, Stanger, Malur & Brundidge, PC (57) ABSTRACT

A handheld electronic device having a slidable display is provided. A display unit is slidably connected to a body unit at two (or more) sliding joints. A mechanical linkage constrains motion at all of the sliding joints to be substantially equal. In this manner, binding of the slidable display is avoided, since binding occurs as a result of unequal motion at sliding joints. In one embodiment, the linkage includes a gear-axle-gear assembly disposed in a recess in the body unit and constrained to rotate as a unit about the axis of the axle. The gears of this assembly are engaged with linear gear racks on the display unit.

25 Claims, 5 Drawing Sheets

U.S. PATENT DOCUMENTS

2006/0109677 A1* 5/2006 Hou .......................... 362/561
2006/0160584 A1* 7/2006 Lee et al. ................ 455/575.4
2006/0205450 A1* 9/2006 Amano et al. ........... 455/575.4
2007/0058328 A1* 3/2007 Zuo et al. ................... 361/679

* cited by examiner

NON-BINDING SLIDING DISPLAY FOR A HANDHELD ELECTRONIC DEVICE

FIELD OF THE INVENTION

This invention relates to sliding mechanisms for handheld electronic device displays.

BACKGROUND

In recent years, handheld computers (and other portable and/or handheld electronic devices) have become increasingly widely used. Since the dividing lines between handheld computers and other handheld electronic devices (e.g., PDAs, wireless IM devices, cell phones, test equipment and pagers) are not clear, we generically refer to all such computers and devices as handheld electronic devices.

Handheld electronic devices frequently include a keyboard for user input and nearly always include a display for providing visual information to a user. It is often desirable for handheld electronic devices to have two (or more) mechanical configurations. In one configuration, the keyboard is exposed for user input and the display is visible. In a second configuration, the keyboard is covered, but the display is still visible. The main motivation for providing such multiple mechanical configurations is to reduce the physical size of the handheld electronic device. This strategy is effective because the keyboard and display are relatively large parts of a handheld electronic device, and are not amenable to straightforward miniaturization. For example, a small keyboard can be difficult to use, and a small display can be difficult to read and can provide only a small amount of information.

The desirability of providing such mechanical configurations of a handheld electronic device has been recognized, and accordingly several approaches have been considered in the art. For example, U.S. Pat. No. 6,665,173 considers a handheld electronic device having a display that slides (or pivots) in a plane to cover and uncover a keyboard. U.S. Pat. No. 6,636,419 considers devices where the display slides in a plane or simultaneously slides and tilts up to uncover a keyboard. U.S. Pat. No. 6,016,176 considers a handheld device having a flexible display that can wrap about the body of the device. The device of U.S. Pat. No. 5,241,303 has a detachable keyboard which can be disposed in two positions, one covered and the other exposed.

A relatively simple mechanical configuration is a display which slides in a plane to cover and uncover the keyboard (e.g., as in U.S. Pat. No. 6,665,173). However, some care is often required in operating devices having this configuration, to avoid mechanical binding of the sliding joint(s) of the device. This problem of mechanical binding of sliding joints is not recognized in the above-cited references, and so these references also provide no solutions to this problem.

Accordingly, it would be an advance in the art to provide a handheld electronic device having a slidable display which does not bind when being moved.

SUMMARY

The present invention provides a handheld electronic device having a slidable display. A display unit is slidably connected to a body unit at two (or more) sliding joints. A mechanical linkage constrains motion at all of the sliding joints to be substantially equal. In this manner, binding of the slidable display is avoided, since binding occurs as a result of unequal motion at sliding joints. In one embodiment, the linkage includes a gear-axle-gear assembly disposed in a recess in the body unit and constrained to rotate as a unit about the axis of the axle. The gears of this assembly are engaged with linear gear racks on the display unit.

BRIEF DESCRIPTION OF THE DRAWINGS

FIG. 1b shows a front view of the handheld electronic device of FIG. 1a.

FIG. 1c shows a side view of the handheld electronic device of FIG. 1a.

FIG. 2 shows a sectional view 120 of the handheld electronic device of FIG. 1a.

FIG. 3 shows a sectional view 110 of the handheld electronic device of FIG. 1a.

FIG. 4a shows a sectional view 130 of the handheld electronic device of FIG. 1a.

DETAILED DESCRIPTION

Figure 1A:
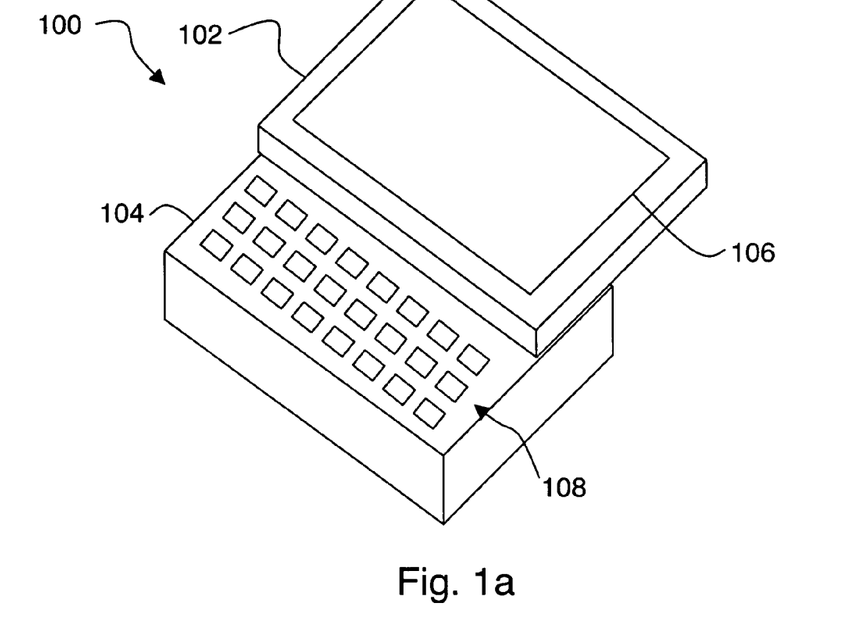
FIG. 1a shows a perspective view of a handheld electronic device according to an embodiment of the invention.

FIG. 1a shows a perspective view of a handheld electronic device 100 according to an embodiment of the invention. A body unit 104 includes a keyboard 108. A display unit 102 includes a display 106. Display 106 faces away from keyboard 108. Display unit 102 is slidably connected to body unit 104 such that the display unit can be positioned to expose keyboard 108 (as shown). Display unit 102 can also be positioned to partially or completely cover keyboard 108 by translating it relative to body unit 104. Although the invention is applicable to any kind of handheld electronic device, some advantages of the invention are more apparent in the context of a specific example, where handheld electronic device 100 is a handheld computer. In this example, keyboard 108 is preferably an alphanumeric keyboard, and display 106 is preferably a compact display such as a liquid crystal display. Body unit 104 preferably includes computer components such as a processor, fixed and removable mass storage, and input/output components (e.g., a network interface, which can be wired or wireless). Electrical connection can be made between body unit 104 and display unit 102 with a connector that can accommodate motion of display unit 102 relative to body unit 104, such as a flexible printed circuit.

Such a handheld computer can be operated with keyboard 108 either exposed or covered. When keyboard 108 is exposed, it can be used for input. When keyboard 108 is covered, other input devices can be used. For example, display unit 102 can include a pen-based computer input interface, as known in the art.

Figure 1B:
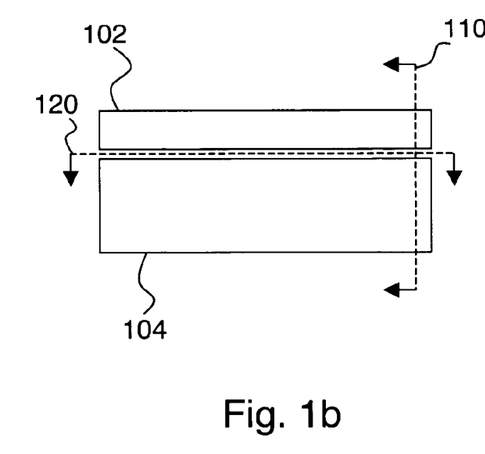
Figure 1C:
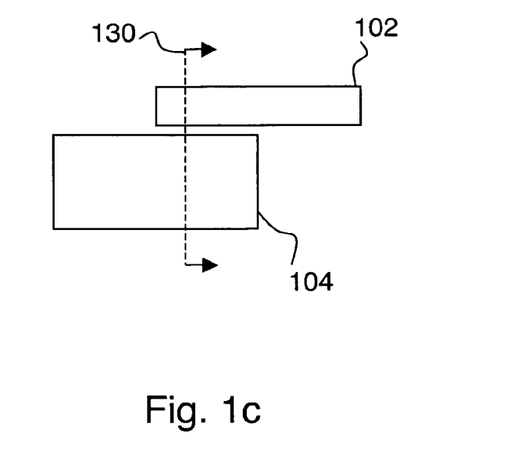

The mechanical connection between display unit 102 and body unit 104 is best appreciated in connection with several sectional views. More specifically, FIG. 1b shows a front view of device 100. View 120 on FIG. 1b is a sectional view along a plane between display unit 102 and body unit 104, looking toward body unit 104. View 110 on FIG. 1b is a sectional view along a plane cutting through a sliding joint between display unit 102 and body unit 104, looking toward the center of device 100. FIG. 1c shows a side view of device 100. View 130 on FIG. 1c is a sectional view along a plane perpendicular to the direction of display motion, looking toward the sliding joints between display unit 102 and body unit 104.

As indicated above, a key feature of the invention is a mechanical linkage coupled to two (or more) sliding joints such that motions at the sliding joints are constrained to be substantially equal. Details of this linkage for a preferred embodiment of the invention are shown on FIGS. 2 and 3.

Figure 2:
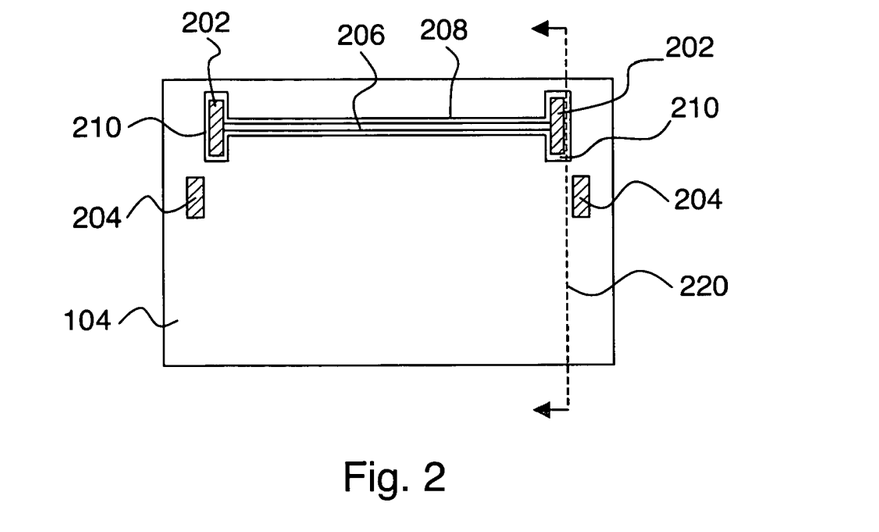

FIG. 2 shows sectional view 120 on FIG. 1b of the handheld electronic device of FIG. 1a. Posts 204 extend up from body unit 104 and form part of the sliding joints. Further consideration of these sliding joints is deferred to the following discussion of FIGS. 4a-b. Two gears 202 are disposed in corresponding gear recesses 210 in body unit 104. An axle 206 is connected to gears 202, one gear at each end of axle 206. Axle 206 is disposed in a recess 208 in body unit 104. Gears 202 are rigidly connected to axle 206, such that the assembly of axle 206 and gears 202 can rotate as a unit about the axis of axle 206. Preferably, recesses 208 and 210 are-arranged such that axle 206 makes low friction physical contact with body unit 104, while gears 202 preferably do not make physical contact with body unit 104. View 220 on FIG. 2 is a sectional view corresponding to view 110 on FIG. 1b.

Figure 3:
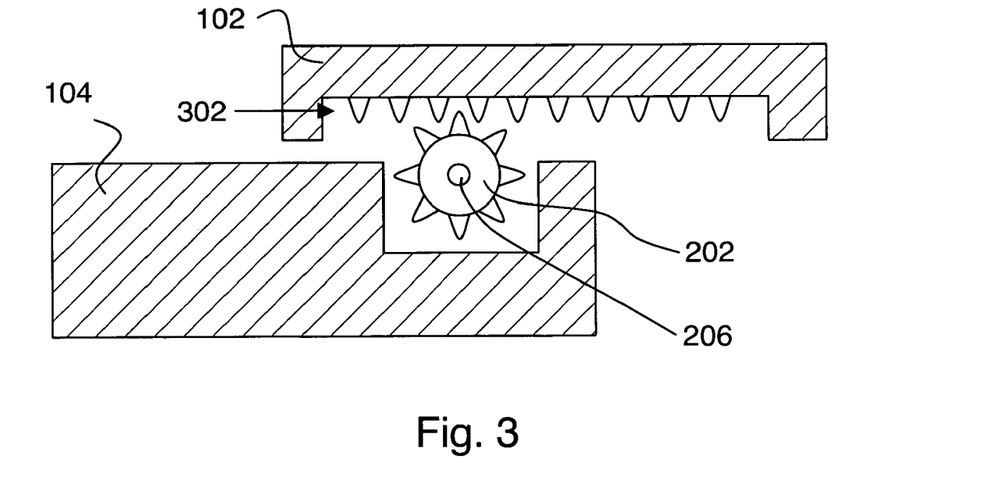

FIG. 3 shows sectional view 110 on FIG. 1b of the handheld electronic device of FIG. 1a. More specifically, FIG. 3 shows a linear gear rack 302, included in display unit 102, which is engaged with gear 202. Display unit 102 includes two linear gear racks 302, each corresponding to one of the two sliding joints between display unit 102 and body unit 104, and each engaged with one of gears 202. Gears 202 preferably have substantially the same diameter, to ensure the same relation between rotation of axle 206 and linear motion of gear racks 302 on the left and right sides of FIG. 2. The view of FIG. 3 corresponds to the right sliding joint on FIG. 1b. The left and right sliding joints between display unit 102 and body unit 104 have the same arrangement, so only the right sliding joint is shown.

The gears are preferably brass, since brass is lubricious. The axle is preferably steel, to provide stiffness. The racks can be any sufficiently hard material. For example, the racks can be integral with a display housing made of a sturdy, lightweight material such as thixo magnesium alloy. For larger electronic devices (i.e., closer to laptop size than handheld size), softer materials (e.g., high-strength, injection-molded plastics) can be used to reduce cost, due to the typical exponential scaling of device strength as device size increases.

In an arrangement such as shown on FIG. 1a, binding can occur if the motion of the left and right sides of display unit 102 relative to body unit 104 is unequal. Such unequal motion tends to tilt display unit 102 with respect to body unit 104, which in turn tends to cause binding at the sliding joints. According to the invention, binding is avoided by constraining the motion of the left and right sliding joints to be substantially equal with a mechanical linkage. In this example, the arrangement of gear racks 302, gears 202 and axle 206 provides this mechanical linkage between the two sliding joints connecting display unit 102 to body unit 104. More specifically, if one side of display unit 102 moves through a distance d, the other side of display unit 102 is forced to move through substantially the same distance d by the gears and racks, since gears 202 and axle 206 rotate as a unit. Thus, the above-identified problem of mechanical binding is overcome.

In a handheld electronic device having a conventional sliding display, a user may have to exercise significant care in moving the display to avoid binding. For example, it is often necessary for a user to apply roughly equal forces to the left and right sides of the display unit when moving it to avoid binding. Such even application of force can be difficult to achieve, especially if a user is using the handheld device with one hand. In sharp contrast, a handheld electronic device according to the invention does not require a user to apply roughly even forces to the left and right to avoid binding. Thus the display can readily be moved by a user without binding, even in one-handed operation. This increased flexibility is a significant advantage of the present invention.

Figure 4A:
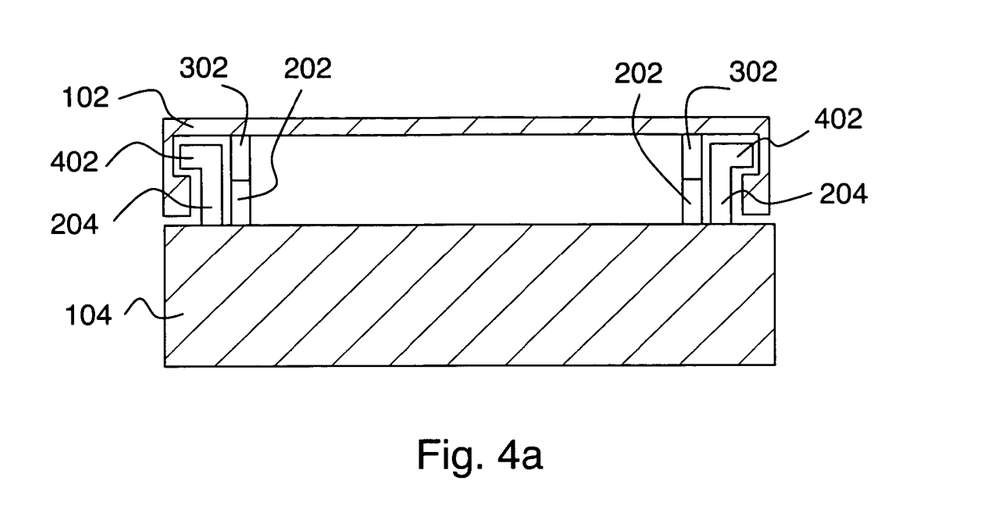

FIG. 4a shows sectional view 130 on FIG. 1c of the handheld electronic device of FIG. 1a. Posts 204 are attached to members 402, such that the combination of a post 204 and a member 402 is generally hook-shaped, as shown. Members 402 are engaged in slots in display unit 102. Preferably these hooks and slots are arranged such that gears 202 and gear racks 302 remain engaged, but are not under significant compression. With this arrangement, display unit 102 is slidably connected to body unit 104, and engagement is maintained between gear racks 302 and gears 202. As a result of this engagement, the assembly including axle 206 and gears 202 is constrained such that motion other that rotation about its axis is substantially inhibited. Thus, once assembled, the configuration of FIGS. 2, 3, and 4a will not fall apart in ordinary use.

An exemplary approach for assembly of this embodiment is to perform the following steps: 1) integrally form gear racks 302 and slots for members 402 in display unit 102; 2) form recesses 208 and 210 in body unit 104; 3) assemble gears 202 and axle 206 into a single assembly; 4) insert this assembly into the recesses in body unit 104; 5) insert hooks including posts 204 and members 402 into the slots of display unit 102; and 6) affix posts 204 to body unit 104.

Figure 4B:
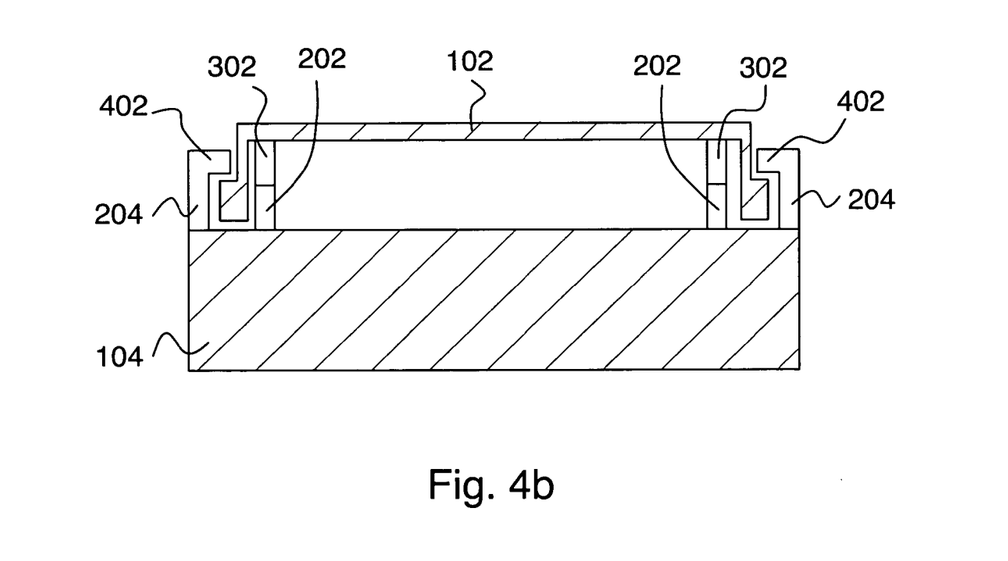
FIG. 4b shows a sectional view 130 of an alternate embodiment of the invention.

The above description is exemplary, and many other variations of the invention are also possible. For example, FIG. 4b shows a sectional view 130 on FIG. 1c of an embodiment of the invention having an alternate arrangement of posts 204 and members 402. In the arrangement of FIG. 4b, members 402 engage with external recesses in display unit 102 that face outward. In contrast, on FIG. 4a, the slots that members 402 engage with are internal slots which face inward rather than outward. The use of internal slots (as on FIG. 4a) may be preferable in cases where a simple appearance is desired for handheld electronic device 100. The use of external recesses as on FIG. 4b may be preferable in cases where posts 204 and members 402 are decorative and/or to facilitate cleaning of the recesses. Although an external recess is shown on FIG. 4b, an external slot can also be used.

Figure 5A:
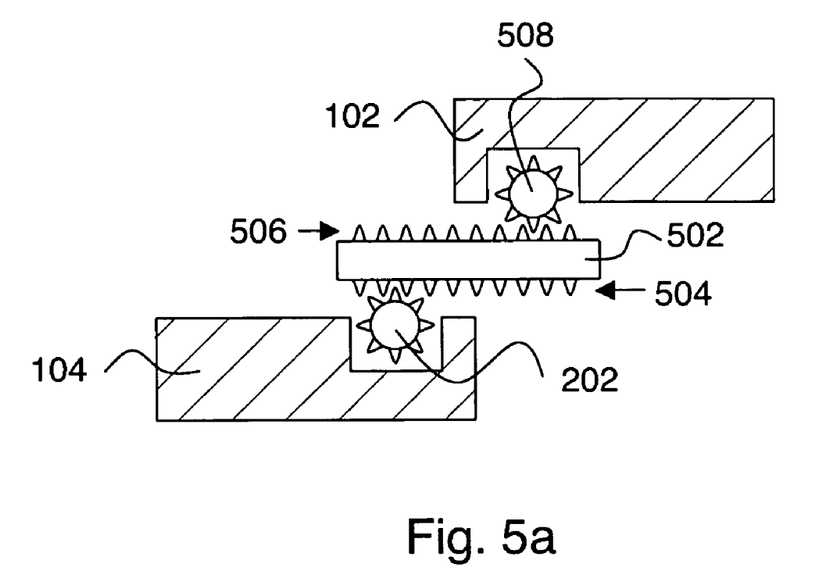
FIG. 5a shows a sectional view 110 of an embodiment of the invention having a different linkage than the linkage of FIG. 3.

The invention can also be practiced with various mechanical linkages. For example, FIG. 5a shows a sectional view 110 on FIG. 1b of an embodiment of the invention having a linkage that allows a greater range of motion than the linkage of FIG. 3. The view of FIG. 5a corresponds to the right sliding joint on FIG. 1b. The left and right sliding joints between display unit 102 and body unit 104 have the same arrangement, so only the right sliding joint is shown. A rail 502 has a linear gear rack 504 facing body unit 104 and a linear gear rack 506 facing display unit 102. Gear rack 504 is engaged with gear 202, and gear rack 506 is engaged with a gear 508. Gears on the left and right sides of this embodiment are connected by axles to make two assemblies similar to the assembly of gears 202 and axle 206 on FIG. 2. One assembly (including gears 202) is connected to body unit 104 and the other assembly (including gears 508) is connected to display unit 102. In this manner, motion of the left and right sliding joints is constrained to be substantially equal. Body unit 104 is slidably connected to rail 502. Display unit 102 is also slidably connected to rail 504. This arrangement provides a greater range of motion than the arrangement of FIG. 3. In particular, overlap of display unit 102 with body unit 104 can be completely eliminated with the arrangement of FIG. 5a, but not with the arrangement of FIG. 3. However, the arrangement of FIG. 3 is simpler than the arrangement of FIG. 5a.

Figure 5B:
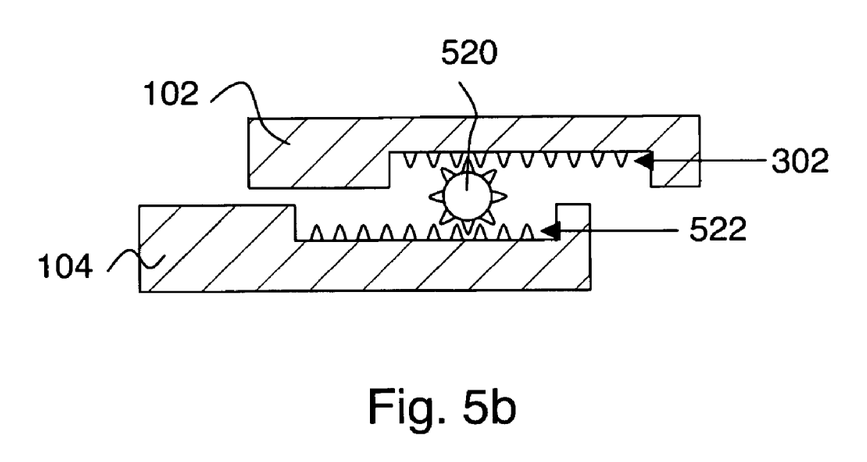
FIG. 5b shows a sectional view 110 of another embodiment of the invention having a different linkage than the linkage of FIG. 3.

FIG. 5b shows a sectional view 110 on FIG. 1b of another embodiment of the invention having a different linkage than the linkage of FIG. 3. The view of FIG. 5b corresponds to the right sliding joint on FIG. 1b. The left and right sliding joints between display unit 102 and body unit 104 have the same arrangement, so only the right sliding joint is shown. A gear 520 is engaged with linear gear rack 302 (on display unit 102) and with a body linear gear rack 522. Gears on the left and right sides of this embodiment are connected by an axle to make an assembly similar to the assembly of gears 202 and axle 206 on FIG. 2. Body unit 104 is slidably connected to display unit 102 (e.g., similarly to FIGS. 4a or 4b). In this manner, motion of the left and right sliding joints is constrained to be substantially equal. Although this embodiment is simpler than some other embodiments, it does require the allocation of space to accommodate lateral translation of the axle connecting left and right gears 520. Such allocation of space can be disadvantageous in cases where minimal size is desired.

Figure 5C:
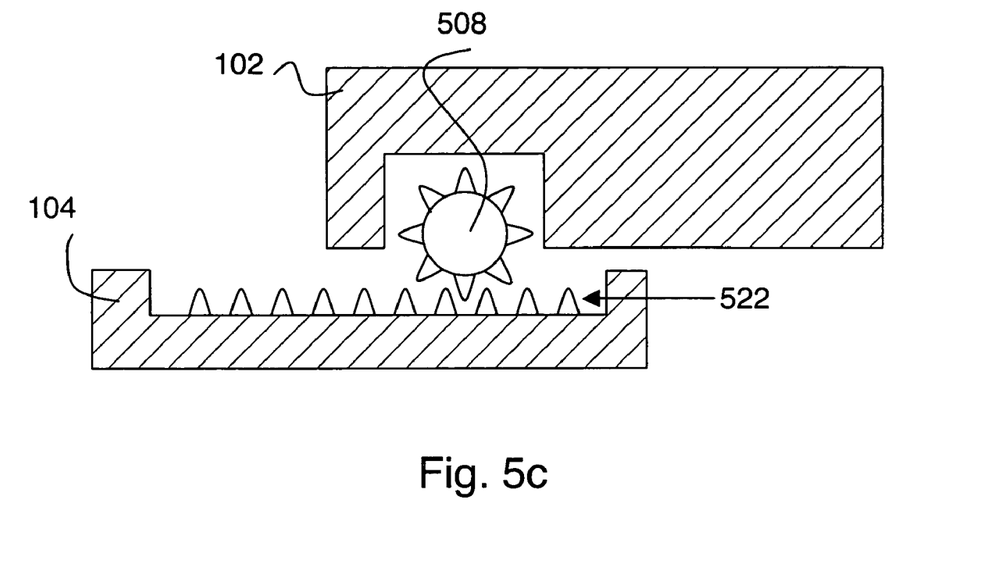
FIG. 5c shows a sectional view 110 of yet another embodiment of the invention having a different linkage than the linkage of FIG. 3.

FIG. 5c shows a sectional view 110 on FIG. 1b of yet another embodiment of the invention where the gear assembly is connected to display unit 102 instead of to body unit 104. The view of FIG. 5c corresponds to the right sliding joint on FIG. 1b. The left and right sliding joints between display unit 102 and body unit 104 have the same arrangement, so only the right sliding joint is shown. Gear 508 is engaged with body linear gear rack 522. Gears on the left and right sides of this embodiment are connected by an axle to make an assembly similar to the assembly of gears 202 and axle 206 on FIG. 2. Body unit 104 is slidably connected to display unit 102 (e.g., similarly to FIGS. 4a or 4b). In this manner, motion of the left and right sliding joints is constrained to be substantially equal.

What is claimed is:

1. A handheld electronic device comprising:
   a body unit having a keyboard;
   a display unit comprising a displaying facing away from said keyboard, wherein said display unit is slidably coupled to said body unit at a first sliding joint and at a second sliding joint, wherein said display unit can be moved between a first position exposing said keyboard and a second position covering part or all of said keyboard; and
   a mechanical linkage coupled to said first and second sliding joints, wherein said linkage constrains motion at said first and second sliding joints to be substantially equal, and wherein said linkage comprises:
   a first linear gear rack at said first sliding joint and on said display unit;
   a second linerar gear at said second sliding joint and on said display unit;
   a first gear at said first sliding joint and engaged with said first linear gear rack;
   a second gear at said second sliding joint and engaged with said second linear gear rack; and
   an axle connected to said first and second gears, wherein said axle and said first and second gears are capable of rotation as a unit about an axis of said axle, wherein said axle is disposed in a recess within said body unit such that motion of said axle other than said rotation is substantially inhibited.

2. The handheld electronic device of claim 1, wherein said first sliding joint comprises a hook attached to said body unit and engaged with a slot in said display unit.

3. The handheld electronic device of claim 2, wherein said slot is an external slot.

4. The handheld electronic device of claim 2, wherein said slot is an external slot.

5. The handheld electronic device of claim 1, wherein said display unit further comprises a pen-based input interface.

6. The handheld electronic device of claim 1, wherein said handheld electronic device is usable when said display unit is in said second position.

7. A handheld electronic device comprising:
   a body unit having a keyboard;
   a display unit comprising a display facing away from said keyboard, wherein said display unit is slidably coupled to said body unit at a first sliding joint and at a second sliding joint, wherein said display unit can be moved between a first position exposing said keyboard and a second position covering part or all of said keyboard; and
   a mechanical linkage coupled to said first and second sliding joints, wherein said linkage constrains motion at said first and second sliding joints to be substantially equal, and wherein said linkage comprises:
   a first linear gear rack at said first sliding joint and on said body unit;
   a second linear gear rack at said second sliding joint and on said body unit;
   a first gear at said first sliding joint and engaged with said first linear gear rack;
   a second gear at said second sliding joint and engaged with said second linear gear rack; and
   an axle connected to said first and second gears, wherein said axle and said first and second gears are capable of rotation as a unit about an axis of said axle, wherein said axle is disposed in a recess within said display unit such that motion of said axle other than said rotation is substantially inhibited.

8. The handheld electronic device of claim 7, wherein said first sliding joint comprises a hook attached to said body unit and engaged with a slot in said display unit.

9. The handheld electronic device of claim 8, wherein said slot is an external slot.

10. The handheld electronic device of claim 8, wherein said slot is an external slot.

11. The handheld electronic device of claim 7, wherein said display unit further comprises a pen-based input interface.

12. The handheld electronic device of claim 7, wherein said handheld electronic device is usable when said display unit is in said second position.

13. A handheld electronic device comprising;
   a body unit having a keyboard;
   a display unit comprising a displaying facing away from said keyboard, wherein said display unit is slidably coupled to said body unit at a first sliding joint and at a second sliding joint, wherein said display unit can be moved between a first position exposing said keyboard and a second position covering part or all of said keyboard; and a mechanical linkage coupled to said first and second sliding joints, wherein said linkage constrains motion at said first and second sliding joints to be substantially equal, and wherein said linkage comprises;

a first linear gear rack at said first sliding joint and on said body unit;

a second linear gear rack at said second sliding joint and on said body unit;

a third linear gear rack at said first sliding joint and on said display unit;

a fourth linear gear rack at said second sliding joint and on said display unit;

a first gear at said first sliding joint and engaged with said first linear gear rack and with said third linear gear rack;

a second gear at said second sliding joint and engaged with said second linear gear rack and with said fourth linear gear rack; and an axle connected to said first and second gears, wherein said axle and said first and second gears are capable of rotation as a unit about an axis of said axle.

14. The handheld electronic device of claim 13, wherein said first sliding joint comprises a hook attached to said body unit and engaged with a slot in said display unit.

15. The handheld electronic device of claim 14, wherein said slot is an external slot.

16. The handheld electronic device of claim 14, wherein said slot is an external slot.

17. The handheld electronic device of claim 13, wherein said display unit further comprises a pen-based input interface.

18. The handheld electronic device of claim 13, wherein said handheld electronic device is usable when said display unit is in said second position.

19. A handheld electronic device comprising:

a body unit having a keyboard;

a display unit comprising a displaying facing away from said keyboard, wherein said display unit is slidably coupled to said body unit at a first sliding joint and at a second sliding joint, wherein said display unit can be moved between a first position exposing said keyboard and a second position covering part or all of said keyboard; and a mechanical linkage coupled to said first and second sliding joints, wherein said linkage constrains motion at said first and second sliding joints to be substantially equal, and wherein said linkage comprises:

a first rail at said first sliding joint and including a first linear gear rack facing said display unit and a second linear gear rack facing said body unit;

a second rail at said second sliding joint and including a third linear gear rack facing said display unit and a fourth linear gear rack facing said body unit;

a first gear at said first sliding joint and engaged with said first linear gear rack;

a second gear at said first sliding joint and engaged with said second linear gear rack;

a third gear at said second sliding joint and engaged with said third linear gear rack;

a fourth gear at said second sliding joint and engaged with said fourth linear gear rack;

a display axle connected to said first and third gears, wherein said display axle and said first and third gears are capable of a first rotation as a unit about an axis of said axle, wherein said display axle is disposed in a recess within said display unit such that motion of said display axle other than said first rotation is substantially inhibited; and a body axle connected to said second and fourth gears, wherein said body axle and said second and fourth gears are capable of a second rotation as a unit about an axis of said body axle, wherein said body axle is disposed in a recess within said body unit such that motion of said body axle other than said second rotation is substantially inhibited.

20. The handheld electronic device of claim 19, wherein said first sliding joint comprises a first body slidable joint between said first rail and said body unit and a first display slidable joint between said first rail and said display unit.

21. The handheld electronic device of claim 19, wherein said first sliding joint comprises a hook attached to said body unit and engaged with a slot in said display unit.

22. The handheld electronic device of claim 21, wherein said slot is an external slot.

23. The handheld electronic device of claim 21, wherein said slot is an external slot.

24. The handheld electronic device of claim 19, wherein said display unit further comprises a pen-based input interface.

25. The handheld electronic device of claim 19, wherein said handheld electronic device is usable when said display unit is in said second position.

* * * * *